W. L. THOMPSON.
OPERATING MECHANISM FOR TRAILER VEHICLES.
APPLICATION FILED DEC. 11, 1919.
1,410,083.
Patented Mar. 21, 1922.
3 SHEETS—SHEET 1.
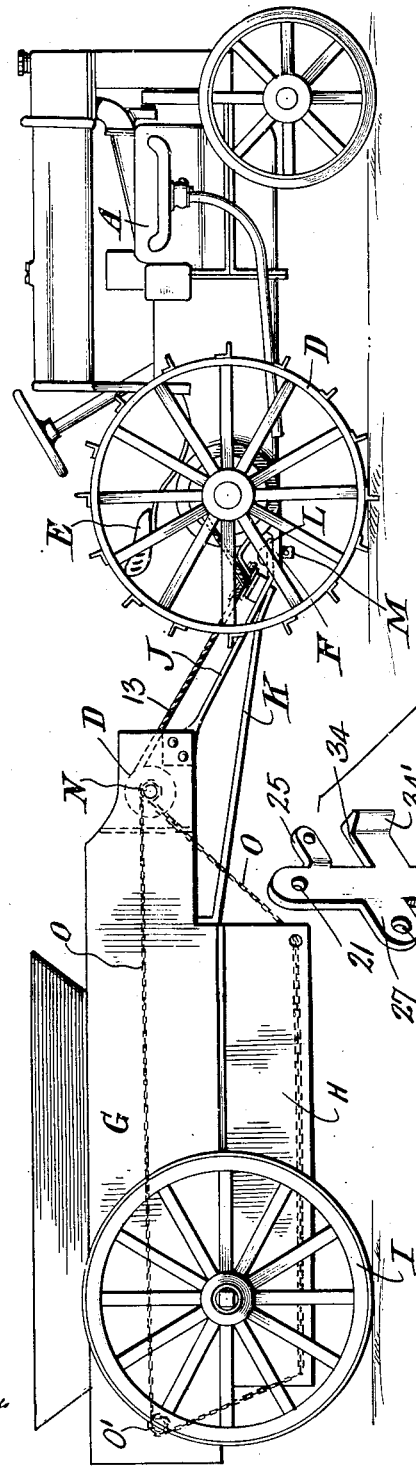
WITNESSES
INVENTOR
W. L. Thompson,
BY
ATTORNEYS

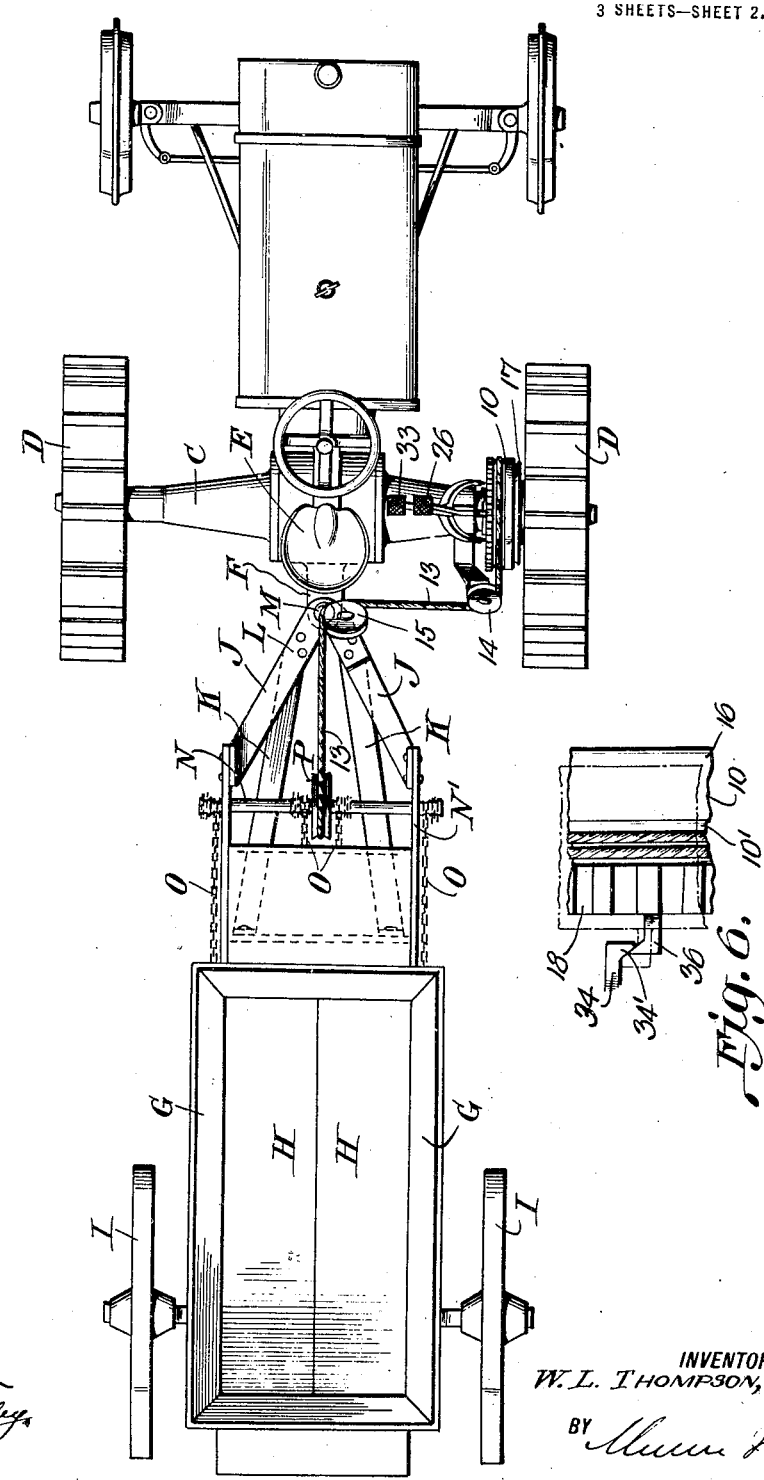

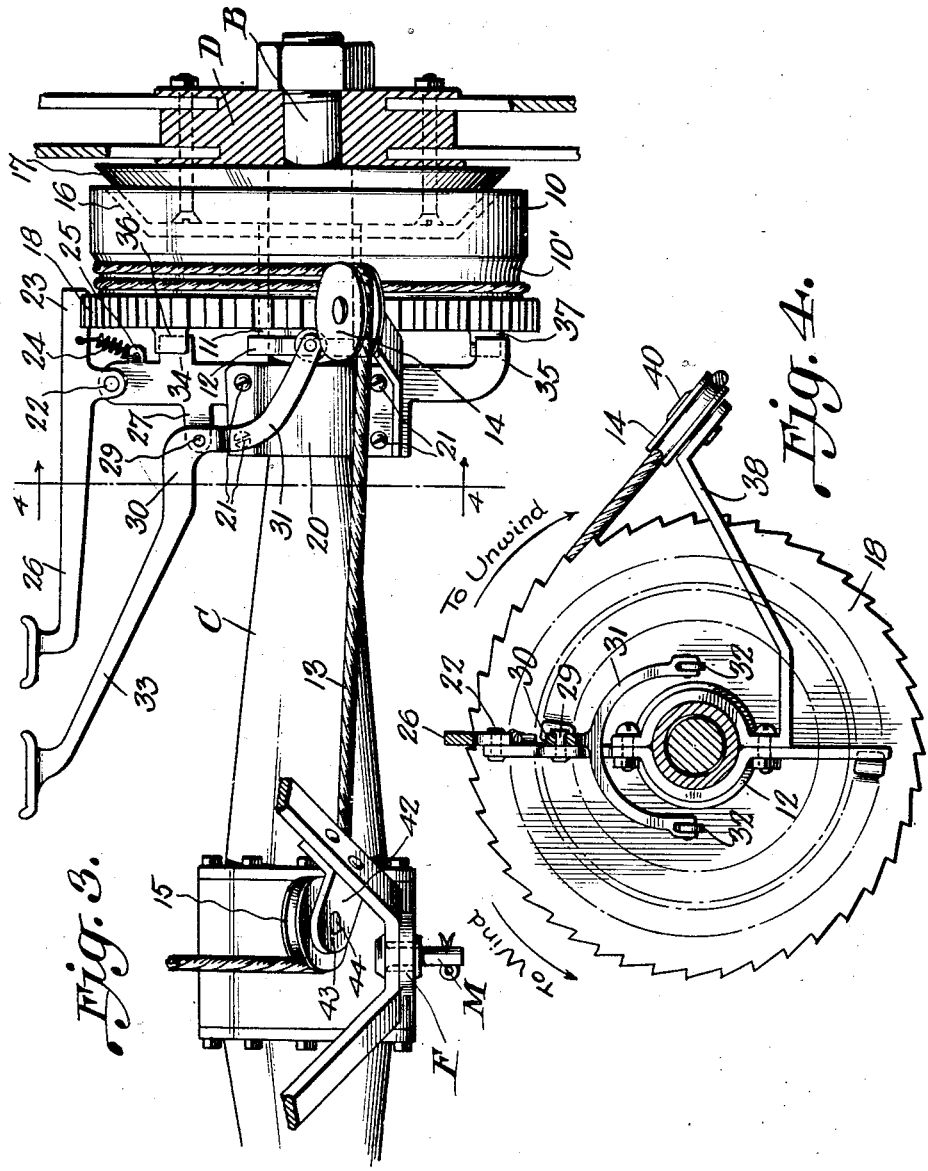

UNITED STATES PATENT OFFICE.

WILLIAM LOVE THOMPSON, OF GREENVILLE, MISSISSIPPI.

OPERATING MECHANISM FOR TRAILER VEHICLES.

1,410,083.      Specification of Letters Patent.    Patented Mar. 21, 1922.

Application filed December 11, 1919. Serial No. 343,998.

*To all whom it may concern:*

Be it known that I, WILLIAM LOVE THOMPSON, a citizen of the United States, and a resident of Greenville, in the county of Washington and State of Mississippi, have invented a new and useful Improvement in Operating Means for Trailer Vehicles, of which the following is a specification.

My invention relates to operating means for trailer vehicles and more particularly to an improved operating means for tractor trailers of the dumping type.

An important object of my invention is to provide an improved operating means for dumping tractor trailers which may be conveniently controlled by the tractor driver from his position in the tractor seat and which will effect the desired dumping operations in the trailer.

Other objects and advantages reside in certain novel features of construction and operation, combination and arrangement of parts which will become apparent as the description proceeds, reference being had to the accompanying drawings forming a part of this specification, in which—

Figure 1 is a side elevation of my improvement,

Figure 2 is a plan view of the same,

Figure 3 is a view partly in elevation and partly in section of the rear axle housing and associated parts of the tractor showing my improvement applied thereto, parts being shown in section and broken away for the sake of illustration, Figure 4 is a sectional view on the line 4—4 of Figure 3, looking in the direction of the arrows, Figure 5 is a detail view of the trip and control-lever post, and Figure 6 is a detail view in plan of the winding sheaves and the trip.

Referring to the drawings it will be seen that my invention contemplates a tractor of any suitable or conventional type. The tractor includes all the features and characteristics of the conventional tractor such as, for instance, the power plant A and suitable transmission mechanism including a rear axle B and its housing C as well as traction wheels D and seat E. It also includes a draw-head F for connection with the trailer.

The trailer vehicle is of the dumping type and includes a suitable body or frame G, bottom dump doors or like dump means H, supporting wheels I and a frame extension including upper frame members J and lower frame members K, the upper frame members being attached to the extreme forward portion of the body G and the lower frame members being also attached to the body portion, as shown in Figures 1 and 2, and both upper and lower frame members converging in both vertical and horizontal planes to form a substantial fifth-wheel structure L which rests upon the draw-head F and is pivotally secured thereto by the king bolt M.

On the trailer, subsidiary operating means for operating the dump doors is provided and consists of a winding shaft N journaled on the forward portion of the body G and having worm or spiral grooves adjacent the center and near the end portions thereof for receiving the righting or elevating chains O secured at one end to the winding shaft and at the other end to the dump doors. The righting chains secured to the winding shaft adjacent the center thereof have their other ends directly secured to the forward ends of the dump doors and the righting chains secured to the winding shaft at its outer end pass over suitable guides O' to the rear of the body and approximately on the same level as the winding shaft and are then secured to the rearward end of the dump doors. A driving sheave P is fixed to the winding shaft N at approximately the center thereof and the force or power necessary to right-up or elevate the dump doors is applied to the driving sheave P in a manner to be hereinafter more fully described. It is apparent that the dump of the trailer is of the gravity type and both the weight of the dump doors and of the material in the vehicle tend to swing the dump doors from closed or righted-up position shown in Figure 2, to discharging or open position shown in Figure 1, and if sufficient force is not applied to the driving sheave P the doors will be automatically released to dump the trailer.

The main operating means for effecting the dumping operations by applying the necessary force to the driving sheave P is carried upon the tractor and preferably upon the rear axle housing of the tractor adjacent one of the traction wheels as shown in the drawings. This main operating means comprises a winding sheave 10 journaled for rotary and sliding movement on a bearing sleeve 11 fixed or otherwise secured to the rear axle housing of the tractor. The bearing sleeve 11 has at its inner end an integral collar 12 which limits the movement of the winding sheave 10 in one direction. A line connection, preferably in the form of a flexible cable or rope 13, has one end secured to the winding sheave 10 and is adapted to be wound upon the winding sheave 10 in the groove 10′ provided therein and is then led around guide pulleys 14 and 15 arranged in a manner to be hereinafter more fully described, to the driving sheave P to which it is secured. The winding shaft 10 has provided on its outer portion and preferably integral therewith, with a female clutch member 16 adapted to cooperate with a male clutch member 17 secured to the hub of the traction wheel D and constrained to rotate with the traction wheel. The traction wheel is, of course, turned with the axle which in turn receives its motion from the power plant of the tractor through the transmission mechanism thereof so that the clutch member 17 is to be regarded as connected to the power plant of the tractor, and when the winding sheave is operated so that its clutch member 16 is engaged with the clutch member 17 it is also connected with the power plant of the tractor. The other face of the winding sheave is provided with an integral ratchet wheel 18.

A combined trip and control-lever post 19, shown in detail in Figure 5, is adapted to be secured upon the axle housing, a stationary part of the tractor, in any suitable manner but preferably by a clamp member 20 and clamp screws 21. The extreme upper portion of the post 19 is provided with a bearing 21 for the pivot bolt 22 of the locking dog 23 adapted to cooperate with the ratchet wheel of the winding sheave to allow it to freely move in one direction, but to prevent its movement in the opposite direction. A retractile spring 24 is secured at one end to the locking dog and at its other end to an ear 25 provided on the post 19 and tends to normally keep the locking dog 23 in engagement with the teeth of the ratchet wheel. The teeth of the ratchet wheel in order to carry out the operation have a straight or vertical wall and an inclined wall as shown in Figure 4. Integral with the locking dog 23 is a control-lever 26, preferably in the form of a foot lever. A lateral extension 27 is formed on the inner side of the post 19 and is provided with a bearing 28 to receive the pivot bolt 29 of the clutch operating means preferably in the form of an arm 30 mounted on the pivot bolt 29 and having a forked extension 31, the outer ends of the arms of the forked extension being provided with rollers 32 adapted to bear against the adjacent face of the winding sheave 16. A control-lever 33 is integrally formed with the arm 30 of the clutch controlling means and is preferably in the form of a foot lever. In this manner sliding movement may be imparted to the winding sheave to effect engagement of its clutch member 16 with the clutch member 17 to impart motion thereto, to effect the righting-up operation of the trailer dump, and the locking dog 23 retains the winding sheave in position to maintain the trailer dump in righted-up position.

When the winding sheave 10 has moved sufficiently to effect the righting-up operation of the trailer dump the clutch members 16 and 17 are automatically disengaged to break the connection between the power plant and the winding sheave and for this purpose the post 19 is provided with trips 34 and 35 extending laterally therefrom towards the winding sheave. The trip 35 is arranged at a greater radial distance from the axle housing and consequently at a greater radial distance from the axis of the winding sheave than the trip 34. It is to be understood that the axis of the post 19 is arranged at right angles to the axis of the axle housing, consequently to the axis of the winding sheave which is concentric with the axle housing. The trips 34 and 35 are provided with inclined surfaces 34′ and 35′ respectively, which project in opposite directions as clearly shown in Figure 5. A projection 36 is formed on the winding sheave and is positioned to cooperate with the trip 34 and a projection 37 is also formed on the winding sheave but is positoned to cooperate with the trip 35. The projections are both provided with inclined surfaces corresponding to the inclined surfaces of the trips 34 and 35. The sides of the trips as well as of the projections opposite the inclined surfaces are formed as flat surfaces and when these flat surfaces engage the parts constitute a stop.

The winding sheave 10 is preferably proportioned with respect to the driving sheave P so that one revolution of the winding sheave is sufficient to turn the driving sheave P so that complete righting-up operation of the dump doors H of the tractor will be effected through the righting-up chains O, and when the winding sheave 10 has completed or is about to complete one revolution the projections 36 and 37 on the winding sheave engage with the trips 34 and 35 on the post 19 to move the winding sheave laterally along its bearing sleeve 11 to disengage the clutch members 16 and 17.

As the trip 35 and its projection 37 are arranged at a greater radial distance from the axis of the winding sheave than the trip 34 and its projection 36, the projection 36 will clear the trip 35 and the projection 37 will clear the trip 34 when the winding sheave has travelled through 180° and the winding sheave can therefore partake of substantially the full 360° of movement before the trips and projections operate to disengage the clutch members. If the winding sheave 10 is undergoing reverse movement to permit dumping movement of the dump doors of the trailer, the same clearance of course prevails and the movement of the projections is not arrested until the winding sheave has partaken of approximately 360° of movement, at which time the flat walls of the projections and trips are engaged to stop the winding sheave.

The clamp member 20 has integrally formed therewith at its lower end a bracket 38, the outer end of which is provided with a bearing 39 for the axle 40 of the guide pulley 14 which is arranged with respect to the winding sheave 10 to lead the cable 13 therefrom transversely across the tractor to a point directly above the king bolt M. Adjacent the king bolt M a bracket 42 is provided and is preferably secured to one of the upper frame members J, the bracket having a bearing 43 at its outer end for the axle 44 of the guide pulley 15. The guide pulley is so positioned and arranged with respect to the king bolt that the lead of the cable from the guide pulley lies in the extended axis of the king bolt. The cable is then extended and secured to the driving sheave P of the trailer. It is apparent that as the lead of the cable from the tractor to the trailer lies in the axis of the king bolt and as near the king bolt as possible or in the axis of swing of the trailer with respect to the tractor, both vertical and horizontal, that any swinging movement of the trailer with respect to the tractor will not materially effect the length of the cable 13 and so will not impose any undue stresses in the cable.

As shown in Figure 2 the control levers or foot pedals of the main operating means are disposed directly beneath and to the side of the tractor seat E so that the driver may readily manipulate these control levers to effect the desired operation.

In practice, when the trailer is to be loaded with material the dumping doors H of the trailer are in righted-up position as shown in Figure 2, and are maintained in this position by the action of the locking dog 23 on the ratchet wheel 18 of the winding sheave 10 which action is transmitted through the cable 13, the driving sheave P, winding shaft N and righting chains O. If it is desired to dump the trailer it is merely necessary for the driver of the tractor to press downwardly on the control-lever 26 which swings the locking dog upwardly and out of engagement with the ratchet wheel of the winding sheave 10, permitting the winding sheave 10 to freely rotate and thereby allowing the bottom dump doors H to swing downwardly to open or discharge position under the influence of gravity. This movement of the doors H unwinds the cable 13 from the winding sheave 10 and winds the same upon the driving pulley P. When it is desired to right-up or elevate the doors from open or discharge position to closed or right-up position it is only necessary for the driver of the tractor to depress the control-lever 33 (the control-lever 26 having been released and allowed to swing back into engagement with the ratchet wheel of the winding sheave as soon as the dumping operation has been completed), and this depression of the control-lever 33 imparts sliding movement to the winding sheave 10 which engages the clutch 16 thereof with the clutch 17 of the traction wheel of the tractor.

The tractor being in motion, its motion is transmitted to the winding sheave 10 and the cable 13 is rewound upon the winding sheave and unwound from the driving sheave P. The resultant movement of the winding sheave P and its shaft N effects a complete elevation or righting-up of the bottom dump doors of the tractor trailer through the righting-up chains O. When this righting-up operation has been completed the projections of the winding sheave engage the trips to disengage the clutch members and thereby prevent further motion from being imparted to the winding sheave. The locking dog 23 is engaged with the ratchet wheel 18 to retain the winding sheave in position as heretofore described. In this manner the driver of the tractor may easily perform from his position on the tractor seat the dumping and righting-up operations of the trailer vehicle by proper manipulations of the control-levers 26 and 33 respectively.

It is to be noted that when the discharging or righting-up operation of the trailer dump is completed the motion of the winding sheave is automatically arrested or stopped. In the first instance, the flat walls of the projections and trips abut each other and in the second instance the inclined walls of the projections and strips first slidably engage each other to disengage the clutch members and then abut each other to stop movement of the winding sheave, as has been heretofore more fully described.

I claim:—

1. A device of the character described comprising in combination with a tractor, a trailer having a gravity dump and operating means carried on said trailer including a winding shaft, operating means carried by the tractor including a winding sheave, a line connection extending between and connected with said winding shaft and said winding sheave, a clutch for connecting said winding sheave to the power plant of said tractor, controlling means for said clutch adapted to be operated by the tractor driver, and an automatic release for said clutch.

2. A device of the character described comprising in combination with a vehicle having a gravity dump, a power plant driving said vehicle and subsidiary operating means for righting-up said dump including a winding shaft, main operating means for actuating the subsidiary operating means including a winding sheave, a line connection extending between and connected with said winding shaft and said winding sheave, a clutch for connecting said winding sheave with the power plant to effect the righting-up operation of said dump and an automatic release for said clutch to automatically disconnect said winding sheave from said power plant when said righting-up operation is completed.

3. A device of the character described comprising in combination with a vehicle having gravity dump comprising swinging bottom dump doors, a power plant for driving said vehicle and subsidiary operating means for righting-up said dump doors including righting-up chains, a winding shaft therefor, main operating means for actuating the subsidiary operating means including a winding sheave, a line connection extending between and connected with said winding shaft and said winding sheave, means controlled by the driver of the vehicle for connecting said winding sheave with the power plant to effect the righting-up of said dump doors, and an automatic release for disconnecting the winding sheave from said power plant when said dump doors are in closed position.

4. A device of the character described comprising the combination with a tractor, a trailer having a gravity dump and subsidiary operating means carried on said trailer for righting-up said dump and maintaining said dump in righted-up position, of main operating means carried by the tractor including a winding sheave journaled for rotary and sliding movement on the axle housing, a line connection secured on said winding sheave and connected with said subsidiary operating means, a clutch member formed integral with said winding sheave, a corresponding clutch member fixed to the adjacent traction wheel of the tractor, means for sliding said winding sheave to engage said clutch members to impart movement to said winding sheave to effect the righting-up operation of said trailer dump, a trip secured to said axle housing, a projection on said winding sheave adapted to cooperate with said trip to disengage said clutch members when said righting-up operation is completed, and releasable means normally engaging said winding sheave permitting righting-up movement and preventing discharge movement.

5. A device of the character described comprising the combination with a tractor, a trailer having a gravity dump and subsidiary operating means carried on said trailer, for righting-up said dump and maintaining said dump in righted-up position, of main operating means carried by the tractor including a winding sheave journaled for rotary and sliding movement on the axle housing, a line connection secured on said winding sheave and connected with said subsidiary operating means, a clutch member formed integral with said winding sheave, a corresponding clutch member fixed to the adjacent traction wheel of the tractor, means for sliding said winding sheave to engage said clutch members to impart movement to said winding sheave to effect the righting-up operation of said trailer dump, a trip secured to said axle housing, a projection on said winding sheave adapted to cooperate with said trip to disengage said cluch members when said righting-up operation is completed.

6. A device of the character described comprising the combination with a tractor, a trailer having a gravity dump and subsidiary operating means carried on said trailer for righting-up said dump and maintaining said dump in righted-up position, of main operating means carried by the tractor including a winding sheave adapted to effect the right-up operation of said trailer dump within one revolution thereof, a clutch for connecting said winding sheave with the power plant of the tractor, trips having their axes intersecting the extending axis of the winding sheave at right angles and arranged at different radial distances from said winding sheave axis, a pair of projections carried on the winding sheave, each projection of said pair being arranged to cooperate with a corresponding trip to disconnect said winding sheave from the power plant of the tractor, all as and for the purposes set forth.

7. A device of the character described comprising the combination with a tractor, a trailer having a gravity dump and subsidiary operating means carried on said trailer for righting-up said dump and maintaining said dump in righted-up position, of main operating means carried by the tractor including a winding sheave, a line connection secured thereto, wound thereon and connected to the subsidiary operating means on said trailer, a clutch for connecting said winding sheave to the power plant of said tractor, controlling means for said clutch, an automatic release for said clutch, a ratchet wheel integral with said winding sheave, and controlling means pivoted to the stationary structure of the tractor and cooperating with said ratchet wheel to retain said operating means in position to maintain said gravity dump in righted-up position, all as and for the purposes set forth.

8. A device of the character described comprising the combination with a tractor, a trailer having a gravity dump and subsidiary operating means carried on said trailer for righting-up said dump and maintaining said dump in righted-up position, of main operating means carried by the tractor including a winding sheave, a line connection secured on said winding sheave and connected with said subsidiary operating means, means for connecting said winding sheave with the power plant of said tractor to effect the righting-up operation of said trailer dump and a release for automatically disconnecting said winding sheave from said power plant when said righting-up operation is completed, and means engaging said winding sheave for releasably maintaining said trailer dump in righted-up position.

9. A device of the character described comprising the combination with a tractor, a trailer having a gravity dump and subsidiary operating means carried on said trailer for righting-up said dump and maintaining said dump in righted-up position, of main operating means carried by the tractor including a winding sheave, a line connection secured on said winding sheave and connected with said subsidiary operating means, means for imparting movement to said winding sheave to right-up said trailer dump, a ratchet wheel integral with said winding sheave, a dog pivoted to the stationary structure of said tractor and adapted to engage said ratchet wheel to maintain said trailer dump in righted-up position or to be disengaged from said ratchet wheel to release said trailer dump, a control lever integral with said dog and operable by the tractor driver, and a spring for normally maintaining said dog in engagement with said ratchet wheel, all as and for the purpose set forth.

10. A device of the character described comprising the combination with a tractor, a trailer having a gravity dump and subsidiary operating means carried on said trailer for righting-up said dump and maintaining said dump in righted-up position, of main operating means carried by the tractor including a winding sheave, a line connection secured on said winding sheave and connected with said subsidiary operating means, means for imparting movement to said winding sheave to right-up said trailer dump, a ratchet wheel integral with said winding sheave, a dog pivoted to the stationary structure of said tractor and adapted to engage said ratchet wheel to maintain said trailer dump in righted-up position or to be disengaged from said ratchet wheel to release said trailer dump, and a control lever integral with said dog and operable by the tractor driver.

11. In a device of the character described in combination with the tractor and a trailer, controlling means upon the tractor, operating means upon the trailer, connecting means between the controlling means of the tractor and the operating means of the trailer including a flexible line connection, and guiding means for said connecting means having its point of deflection lying substantially in the axis of swing of said trailer, whereby the point of lead of the flexible line connection of said connecting means lies substantially in the axis of swing of said trailer.

12. In a device of the character described, in combination, a tractor, a power plant on said tractor, a trailer having a gravity dump comprising swinging bottom dump doors, subsidiary operating means carried by the trailer for righting-up said dump doors including righting-up chains and a winding shaft, main operating means carried by the tractor for actuating the subsidiary operating means and including a winding sheave, a clutch for connecting said winding sheave to the power plant of the tractor and controlling means for said clutch adapted to be operated by the tractor driver, and a line connection extending between and connected with said winding shaft and said winding sheave.

WILLIAM LOVE THOMPSON.